United States Patent
Coq et al.

(10) Patent No.: US 10,256,509 B2
(45) Date of Patent: Apr. 9, 2019

(54) SHORT-CIRCUIT PROTECTION IN WET-CELL BATTERY

(71) Applicant: International Business Machines Corporation, Armonk, NY (US)

(72) Inventors: Marc H. Coq, Hopewell Junction, NY (US); Richard J. Fishbune, Rochester, MN (US); Mark E. Maresh, Wake Forest, NC (US); Eric B. Swenson, Pine Island, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 157 days.

(21) Appl. No.: 15/426,452

(22) Filed: Feb. 7, 2017

(65) Prior Publication Data
US 2018/0226691 A1    Aug. 9, 2018

(51) Int. Cl.
*H01M 10/00* (2006.01)
*H01M 10/14* (2006.01)
*H01M 10/12* (2006.01)
*H01M 10/16* (2006.01)

(52) U.S. Cl.
CPC .......... *H01M 10/14* (2013.01); *H01M 10/12* (2013.01); *H01M 10/16* (2013.01)

(58) Field of Classification Search
CPC ......... H01M 10/0525; H01M 2220/30; H01M 10/0436
See application file for complete search history.

(56) References Cited

U.S. PATENT DOCUMENTS

| | | | |
|---|---|---|---|
| 4,405,697 A | | 9/1983 | Rowlette |
| 5,390,350 A | * | 2/1995 | Chung ................ G06F 1/3203 713/322 |
| 7,132,195 B2 | | 11/2006 | Hottori et al. |
| 2007/0251830 A1 | * | 11/2007 | Conrad .................... C25B 1/02 205/508 |
| 2011/0043168 A1 | * | 2/2011 | Bucur ............... G01R 31/3655 320/127 |

(Continued)

FOREIGN PATENT DOCUMENTS

| | | |
|---|---|---|
| CN | 2760768 Y | 2/2006 |
| CN | 2893942 Y | 4/2007 |
| CN | 201946661 U | 8/2011 |

(Continued)

*Primary Examiner* — Cynthia H Kelly
*Assistant Examiner* — Monique M Wills
(74) *Attorney, Agent, or Firm* — Garg Law Firm, PLLC; Rakesh Garg; Tihon Poltavets

(57) ABSTRACT

A wet cell battery, where a first cell in a wet-cell battery includes a set of anode electrodes and a set of cathode electrodes, and where electrically conductive debris accumulates on a surface inside the first cell to an expected height. An anode electrode in the set of anode electrodes has an anode end closest to the surface, and a cathode electrode in the set of cathode electrodes has a cathode end closest to the surface. A first gap distance between the anode end and the surface is different from a second gap distance between the cathode end and the surface. When the electrically conductive debris accumulates up to the expected height, the debris fails to make simultaneous electrical contact with the anode electrode and the cathode electrode due to the different gap distances.

20 Claims, 4 Drawing Sheets

(56) References Cited

U.S. PATENT DOCUMENTS

2011/0311877 A1* 12/2011 Matsuda ............... H01M 4/742
                                                                   429/241

FOREIGN PATENT DOCUMENTS

| CN | 202487718 U | 3/2012 |
| CN | 202495527 U | 10/2012 |
| JP | 2005149916 A | 6/2005 |
| JP | 5228601 B2 | 7/2013 |

* cited by examiner

SHORT-CIRCUIT PROTECTION IN WET-CELL BATTERY

TECHNICAL FIELD

The present invention relates generally to a method, system, and computer program product for preventing short circuits inside batteries. More particularly, the present invention relates to a method, system, and computer program product for short-circuit prevention in wet-cell battery.

BACKGROUND

Batteries, such as automotive or marine batteries, include one or more cells connected to one another. The cells are electrically connected in a serial connection to increase the voltage output of the battery. The cells are electrically connected in parallel to increase a current output of the battery. A battery can employ series connection, parallel connection, or both between various cells.

A wet-cell battery is a battery in which a cell uses a liquid electrolyte. Electrically conductive electrodes are at least partially submerged into the electrolyte, and the ion exchange occurs between the electrodes through the electrolyte.

A cell has at least two electrodes—one of the positive polarity and one of the negative polarity. In some cells, an electrode takes the form of a plate that is suspended into the electrolyte. Other shapes of the electrodes are also possible and used. In some cells, several electrodes are electrically coupled with one another to electrically function as a single electrode of a designated polarity.

SUMMARY

The illustrative embodiments provide a method, system, and computer program product. An embodiment includes a method that constructs a first cell in a wet-cell battery, the first cell comprising a set of anode electrodes and a set of cathode electrodes. The embodiment identifies a surface inside the first cell, wherein electrically conductive debris accumulates on the surface to an expected height. The embodiment configures, by causing a processor and a memory to manipulate a fabrication machine, an anode electrode in the set of anode electrodes and a cathode electrode in the set of cathode electrodes, wherein the anode electrode has an anode end closest to the surface, wherein the cathode electrode has a cathode end closest to the surface, and wherein the configuring causes a first gap distance between the anode end and the surface to be different from a second gap distance between the cathode end and the surface. The embodiment prevents a short-circuit from the electrically conductive debris when the debris accumulates up to the expected height, by causing the debris to fail to make simultaneous electrical contact with the anode electrode and the cathode electrode due to the first gap distance being different from the second gap distance.

An embodiment includes a computer usable program product. The computer usable program product includes one or more computer-readable storage devices, and program instructions stored on at least one of the one or more storage devices.

An embodiment includes a wet-cell battery apparatus. The wet-cell battery is fabricated using the method described herein.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
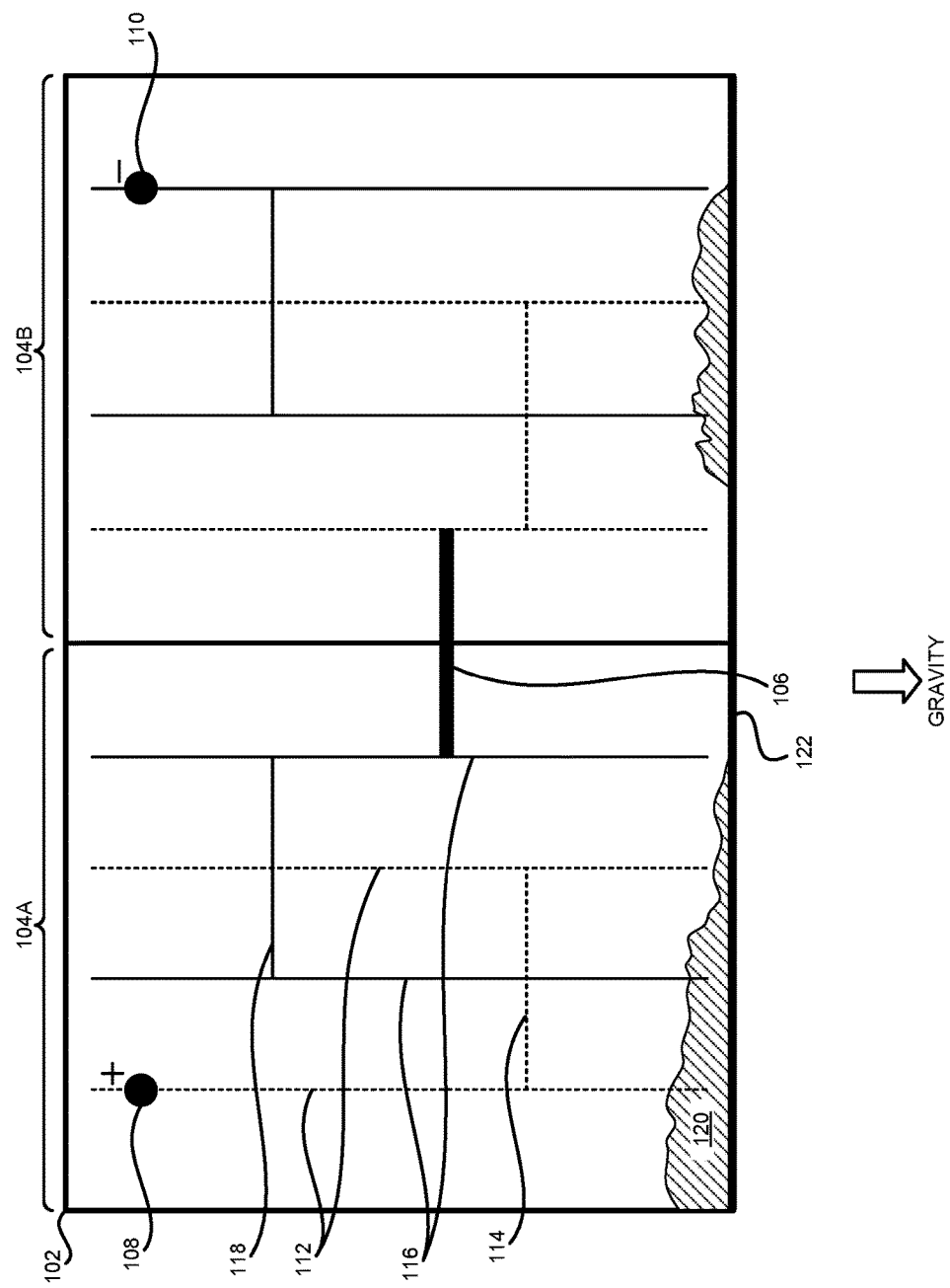
FIG. 1 depicts a prior-art configuration of a wet-cell battery which can be modified according to an illustrative embodiment to prevent a short circuit.

Consider an example of a lead-acid battery, which is a non-limiting example of wet-cell batteries. In a lead-acid battery, an alloy or compound of Lead (Pb) coats or forms some or all of the electrodes (hereinafter referred to as "lead electrode"). The lead electrode is suspended, at least partially, in an acidic electrolyte. One lead electrode is coupled to a battery terminal of the positive polarity, and another lead electrode is coupled to another battery terminal of the negative polarity.

During the operation of the lead-acid battery, particles of the lead alloy or compound flake off from the electrodes. The debris of these particles floats through the electrolyte and deposits on a surface of the inside of the battery due to the action of gravity on these particles.

Typically, in an upright installation of the battery, where the battery terminals generally protrude out and up from the battery, the debris settles and collects on the bottom surface of the battery. In a side-ways installation of the battery, where the battery is installed on one side, the debris collects on a side wall of the battery.

The particles collecting in this debris inside the battery are electrically conductive. The illustrative embodiments recognize that the build-up of conductive debris inside the wet-cell battery can and does cause electrical short-circuits between electrodes of opposite polarities. Generally, the short-circuit occurs when the debris builds up to a level where the debris makes electrically conductive contact with the submerged electrodes of opposite polarities, allowing an electrical current to be able to flow directly from an electrode of one polarity through the debris and to an electrode of another polarity without requiring the ion transfer function of the electrolyte.

The short-circuit within a cell in this manner causes the voltage output of the cell to drop. Often, the short-circuited cell becomes non-contributing to the total voltage output of the batter. For example, a six-cell battery has six cells connected in series, each cell producing 2 volts (V), for a total of 12 V output of the battery. A short-circuit in one cell, as described herein, can cause the total voltage of the battery to drop to 10 V. Such a drop in the voltage output often renders a wet-cell battery unsuitable for the intended application.

The illustrative embodiments recognize that the presently available shape and structure of the electrodes used in wet-cell batteries is conducive to short-circuits from the debris produced during the use of the battery. The illustrative embodiments recognize that the presently available tools or solutions do not address these needs or provide adequate solutions for solving this short-circuit problem. The illustrative embodiments used to describe the invention generally address and solve the above-described problems and other problems related to conductive debris in wet-cell batteries.

A lead-acid battery is used as a non-limiting example of wet-cell batteries for describing and illustrating the structures and operations of the illustrative embodiments. From this disclosure, those of ordinary skill in the art will be able to conceive many other types of electrodes, electrolytes, and generally other types of wet-cell batteries where the problems described herein can occur, and the embodiments can be applied to such other battery configurations within the scope of the illustrative embodiments.

An embodiment can be implemented in a wet-cell battery as an electrode having a described shape and/or size property. A fabrication process for producing the electrodes of said shape and/or size can be implemented in a software application. The application implementing an embodiment can be configured as a modification of an existing fabrication system, as a separate application that operates in conjunction with an existing fabrication system, a standalone application, or some combination thereof.

An embodiment identifies a surface on which the collection of debris is likely inside the cell of a wet-cell battery. The embodiment determines a gap between the surface and an electrode inside the cell. The embodiment fabricates, or causes to be fabricated, one set of one or more electrodes of a first shape or size. The first shape or size causes the gap to be at least equal to a first distance from the surface. This set of electrodes is configured relative to the surface to form said gap, and is used for a designated polarity, such as an anode or a cathode.

The embodiment fabricates, or causes to be fabricated, another set of one or more electrodes. The shape or size of the electrodes of the second set is such that a second gap between an electrode of the second set is at least equal to a second distance. This second set of electrodes is configured relative to the surface to form said second gap, and is used for the opposite polarity, such as a cathode (if the first set is used as an anode), or an anode (if the first set is used as a cathode).

For example, in a simple case, all electrodes forming the anode or the positive terminal of a cell may be fabricated as plates. The anode plates are suspended such that their ends or edges, which are closest to the bottom, are x millimeters away from the bottom of the cell inside the cell. Furthermore, all electrodes forming the cathode or the negative terminal of the cell are also fabricated as plates. The cathode plates may be suspended such that their ends or edges, which are closest to the bottom, are y millimeters away from the bottom of the cell inside the cell. X and y are different from one another.

When fabricated in this example manner, the electrodes of different polarities are at different distances from the surface where the conductive debris collects. Suppose x is smaller than y. If the debris were to collect to a height of x millimeters during the useful life of the battery, the debris would only form an electrically conductive path between electrodes of the same polarity. For example, the debris would electrically connect the edges of two anode plates, which does not create a short-circuit inside the cell. The same case applies if y were smaller than x, and the debris of height y would connect two cathode plates without creating a short circuit.

Generally, an embodiment can be adapted to fabricate the electrodes such that no electrode of a given polarity is at the same gap distance as an electrode of the opposite polarity, from the surface on which the conductive debris accumulates inside a cell. For example, suppose that each polarity uses three electrodes each—A1, A2, A3 for the anode, and C1, C2, C3 for the cathode. Further assume that the debris build up is expected to be 5 millimeters during the useful life of the battery. An embodiment can be configured to produce A1, A2, and A3 such that their edges are at least 6 millimeters but less than 8 millimeters away from the surface, and configure C1, C2, and C3 such that their edges are at least 8 millimeters away from the surface. Even if the debris accumulates to 6 millimeters, the debris will only contact the anodes and no cathodes in this example configuration.

These examples of gap distances are not intended to be limiting. From this disclosure, those of ordinary skill in the art will be able to conceive many other gap distances, including different distances for each individual electrodes, and the same are contemplated within the scope of the illustrative embodiments.

The manner of short-circuit prevention in wet-cell battery described herein is unavailable in existing methods. A method of an embodiment described herein, when implemented to fabricate the electrodes of a wet-cell battery, comprises substantial advancement of the functionality of that battery in avoiding short circuiting the electrodes of opposite polarities due to accumulated conductive debris.

The illustrative embodiments are described with respect to certain types of cells, batteries, connections, electrodes, electrolytes, alloys or compounds, shapes, sizes, gap distances, surfaces on which accumulation occurs, orientation of the installation, voltages and current, metals, materials, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

The illustrative embodiments are described using specific designs, layouts, schematics, and tools only as examples and are not limiting to the illustrative embodiments. The examples in this disclosure are used only for the clarity of the description and are not limiting to the illustrative embodiments. Additional operations, actions, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

With reference to FIG. 1, this figure depicts a prior-art configuration of a wet-cell battery which can be modified according to an illustrative embodiment to prevent a short circuit. Battery 102 includes any number of cells, such as cells 104A and 104B. An example two-cell configuration is depicted only as a non-limiting example for the clarity of the drawings.

Cells 104A and 104B are electrically connected using cell-to-cell connection 106. In the depicted non-limiting example, connection 106 connects cells 104A and 104B in series.

Battery 102 has terminals 108 and 110. Terminal 108 is of the positive polarity and terminal 110 is of the negative polarity as shown. A terminal is electrically coupled with one or more electrodes. As a non-limiting example, the electrodes used in battery 102 are flat plates of a certain thickness and are depicted in FIG. 1 in an edge-view. For example, plates 112 are two anode plates in cell 104A. Plates 112 are electrically coupled with each other using connector 114. Similarly, plates 116 are two example cathode plates in cell 104A. Plates 116 are electrically coupled with each other using connector 118. Cell 104B has a similar electrode structure configured therein.

Debris 120 is accumulated conductive particles as described herein. Assuming that battery 102 is installed and used in the depicted orientation, gravity acts in the direction shown. Accordingly, debris 120 collects on the inside surface of bottom 122 inside cells 104A and 104B of battery 102.

Depicted in FIG. 1 is a common short-circuit failure that occurs in prior-art wet-cell batteries such as battery 102. As can be seen, debris 120, which is conductive, has accumulated to a height sufficient to make electrical contact with plates 112 and 116, which are of opposite polarities. Such a contact by debris 120 causes a short-circuit between plates 112 and 116 causing cell 104A to exhibit low or zero voltage.

Figure 2:
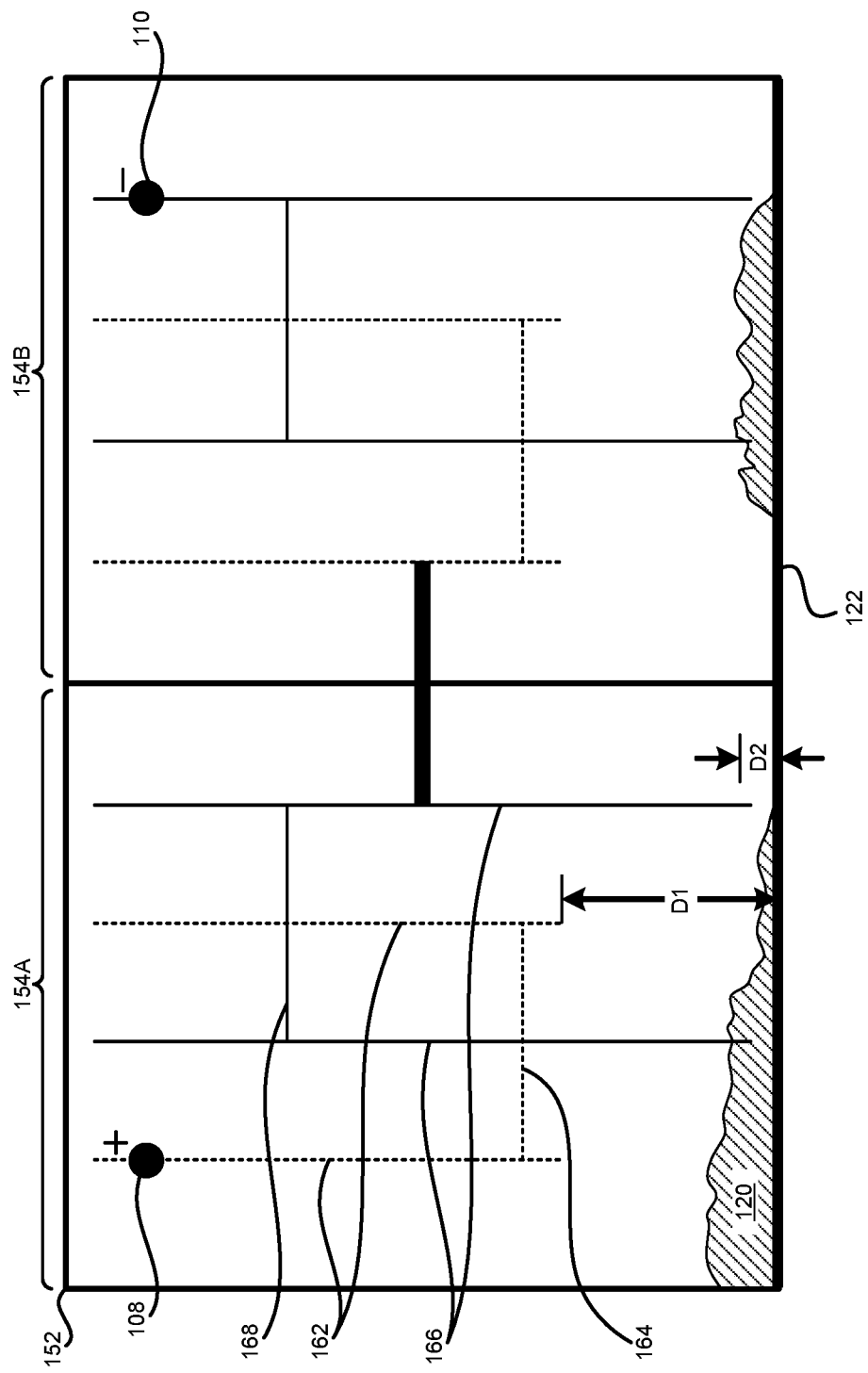
FIG. 2 depicts a block diagram of an example configuration for short-circuit prevention in wet-cell battery in accordance with an illustrative embodiment.

With reference to FIG. 2, this figure depicts a block diagram of an example configuration for short-circuit prevention in wet-cell battery in accordance with an illustrative embodiment. Battery 152 is a modified wet-cell battery, which operates on similar principles as those of battery 102 in FIG. 1, and is usable for similar purposes as battery 102 of FIG. 1.

Plates 162 correspond to plates 112 in FIG. 1 and are connected with each other using connector 164 in a manner similar to the connection formed by connector 114 in FIG. 1. Plates 166 correspond to plates 116 in FIG. 1 and are connected with each other using connector 168 in a manner similar to the connection formed by connector 118 in FIG. 1. Debris 120 collects on the inside surface of bottom 122 in a manner described with respect to FIG. 1.

In FIG. 1, plates 112 and 116 were substantially at the same gap distance from the inside surface of bottom 122, which caused debris 120 to make contact with plates 112 and 116 by reaching a height equal to or greater than that common gap distance. Advantageously, in FIG. 2, plates 162 are at gap distance D1 from bottom 122 and plates 166 are at gap distance D2 from bottom 122. Gap distance D1 is different from D2. As shown, D1 is greater than D2, but can also be implemented where D2 is greater than D1. At least D1 is set to a value that is greater than an expected height of debris 120 at the end of useful life of battery 152.

As can be seen, debris 120, even when accumulated on the inside surface of bottom 122 in a worst-case scenario to height D2, now is able to make electrical contact with only plates 166. Plates 162 of the opposite polarity remain out of reach of accumulated debris 120 due to increased gap distance D1.

Figure 3:
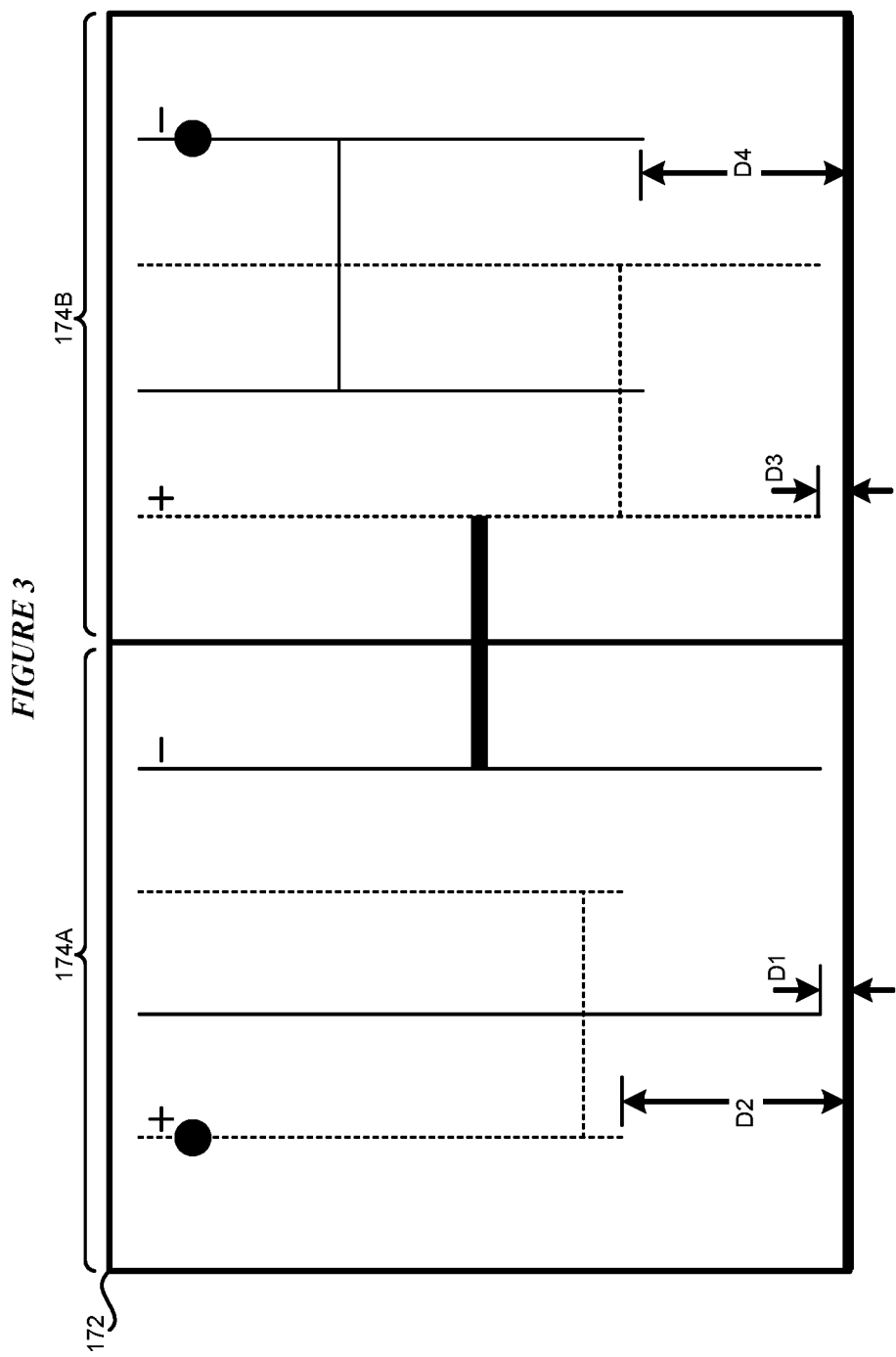
FIG. 3 depicts a block diagram of an example alternate configuration for short-circuit prevention in wet-cell battery in accordance with an illustrative embodiment.

With reference to FIG. 3, this figure depicts a block diagram of an example alternate configuration for short-circuit prevention in wet-cell battery in accordance with an illustrative embodiment. Battery 172 is operationally similar to battery 152 in FIG. 2.

Different cells in battery 172 can be configured differently to avoid short-circuits within the cells. For example, as depicted in cell 174A, the electrodes of the negative polarity are at distance D1 from the surface where the debris is expected to accumulate and the electrodes of the positive polarity are at distance D2 from the surface. D1 and D2 are different as described herein. For example, D2 is greater than D1, placing the ends of the positive electrodes farther from the surface than the ends of the negative electrodes.

Cell 174B can be configured differently from cell 174A. For example, in cell 174B, the electrodes of the positive polarity are at distance D3 from the surface where the debris is expected to accumulate and the electrodes of the negative polarity are at distance D4 from the surface. D3 and D4 are different as described herein. In this example, D4 is greater than D3, placing the ends of the negative electrodes farther from the surface than the ends of the positive electrodes.

These examples of distances of electrode ends from the surface of accumulation are not intended to be limiting. From this disclosure, those of ordinary skill in the art will be able to conceive many other ways of configuring the electrode-end distances and the same are contemplated within the scope of the illustrative embodiments. For example, different plates of the same polarity can also be made in different lengths—e.g., anode plate A1 can be a different length than anode plate A2 as long as all gap distances of the anode plates are greater (or smaller) as compared to all gap distances of the cathode plates.

Furthermore, the size of the electrodes can be further adjusted depending on where on the surface the debris is expected to accumulate. For example, if the debris is expected to collect in the corners, then plates at the end can be shorter than the plates in the middle, and vice-versa.

Figure 4:
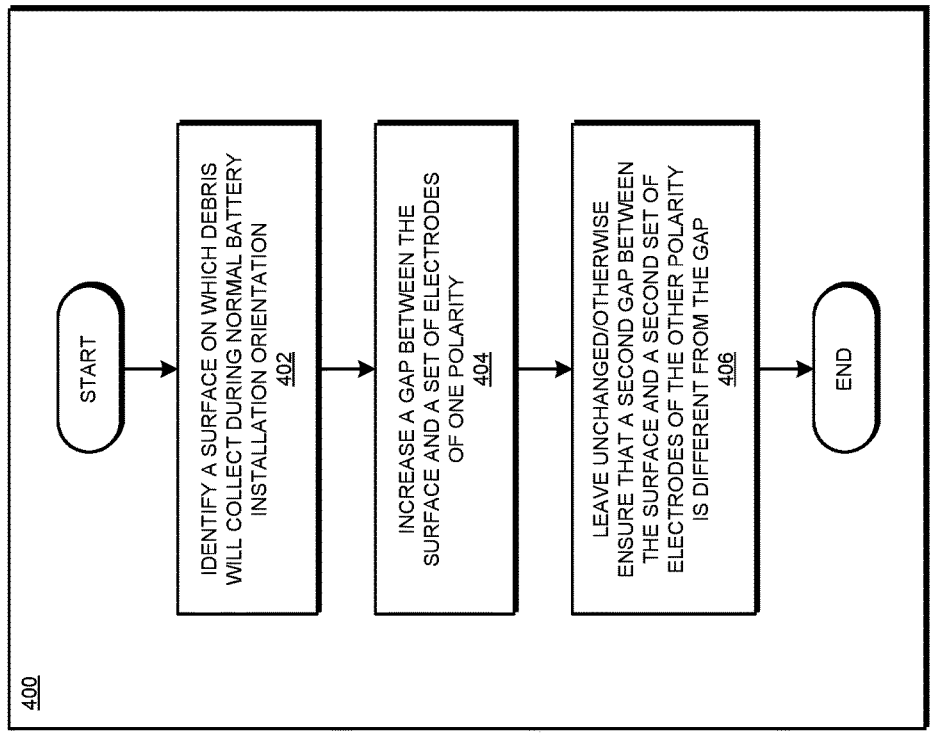
FIG. 4 depicts a flowchart of an example process for configuring the electrodes in a cell for short-circuit prevention in wet-cell battery in accordance with an illustrative embodiment.

With reference to FIG. 4, this figure depicts a flowchart of an example process for configuring the electrodes in a cell for short-circuit prevention in wet-cell battery in accordance with an illustrative embodiment. Process 400 can be used to form cells 104A and/or 104B in FIG. 1, cells 164A and/or 164B in FIG. 2, or cells 174A and/or 174B in FIG. 3.

An application executing in a data processing system using a processor and a memory, executes process 400. The application identifies a surface on which debris is expected to collect during an expected orientation of the battery in an installation (block 402). The application increases a gap between the surface and a set of electrodes of one polarity (block 404). For a second gap between a second set of electrodes and the surface, the application either leaves the second gap unchanged if already different from the gap, or adjusts the second gap such that the second gap is different from the gap of the first set of electrodes (block 406). The application ends process 400 thereafter.

Thus, a modified battery apparatus, and computer implemented method for fabricating the apparatus are provided in the illustrative embodiments. Where an embodiment or a portion thereof is described with respect to a particular type of apparatus or structure, the apparatus or structure are adaptable to specific implementations using different manifestation of that type.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The process of the present invention may be implemented in a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An apparatus comprising:
   a first cell in a wet-cell battery, the first cell comprising a set of anode electrodes and a set of cathode electrodes;
   a surface inside the first cell, wherein electrically conductive debris accumulates on the surface to a height;
   an anode electrode in the set of anode electrodes and a cathode electrode in the set of cathode electrodes, wherein the anode electrode has an anode end closest to the surface, wherein the cathode electrode has a cathode end closest to the surface, and wherein the anode electrode and the cathode electrode are configured to cause a first gap distance between the anode end and the surface to be different from a second gap distance between the cathode end and the surface; and
   the electrically conductive debris, when accumulated up to the height, fails to make simultaneous electrical contact with the anode electrode and the cathode electrode due to the first gap distance being different from the second gap distance.

2. The apparatus of claim 1, wherein the debris reaches the height over a useful life of the wet-cell battery.

3. The apparatus of claim 1, wherein the debris comprises conductive material separating from at least one of the set of anode electrodes and the set of cathode electrodes.

4. The apparatus of claim 1, wherein the anode electrode comprises a plate having a flat shape and an edge, the edge forming the anode end.

5. The apparatus of claim 1, wherein the surface is substantially orthogonal to a direction of gravity acting on the wet-cell battery when the wet-cell battery is in use.

6. The apparatus of claim 1, wherein the first gap distance is greater than the second gap distance, and wherein gap distances of each anode electrode in the set of anode electrodes is greater than the second gap distance.

7. The apparatus of claim 1, wherein the second gap distance is greater than the first gap distance, and wherein gap distances of each cathode electrode in the set of cathode electrodes is greater than the first gap distance.

8. A method comprising:
   constructing a first cell in a wet-cell battery, the first cell comprising a set of anode electrodes and a set of cathode electrodes;
   identifying a surface inside the first cell, wherein electrically conductive debris accumulates on the surface to a height;
   configuring, by causing a processor and a memory to manipulate a fabrication machine, an anode electrode in the set of anode electrodes and a cathode electrode in the set of cathode electrodes, wherein the anode electrode has an anode end closest to the surface, wherein the cathode electrode has a cathode end closest to the surface, and wherein the configuring causes a first gap distance between the anode end and the surface to be different from a second gap distance between the cathode end and the surface; and
   preventing a short-circuit from the electrically conductive debris when the debris accumulates up to the height, by causing the debris to fail to make simultaneous electrical contact with the anode electrode and the cathode electrode due to the first gap distance being different from the second gap distance.

9. The method of claim 8, wherein the debris reaches the height over a useful life of the wet-cell battery.

10. The method of claim 8, wherein the debris comprises conductive material separating from at least one of the set of anode electrodes and the set of cathode electrodes.

11. The method of claim 8, wherein the anode electrode comprises a plate having a flat shape and an edge, the edge forming the anode end.

12. The method of claim 8, wherein the surface is substantially orthogonal to a direction of gravity acting on the wet-cell battery when the wet-cell battery is in use.

13. The method of claim 8, wherein the first gap distance is greater than the second gap distance, and wherein gap distances of each anode electrode in the set of anode electrodes is greater than the second gap distance.

14. The method of claim 8, wherein the second gap distance is greater than the first gap distance, and wherein gap distances of each cathode electrode in the set of cathode electrodes is greater than the first gap distance.

15. A computer usable program product comprising one or more computer-readable storage mediums, and program instructions stored on at least one of the one or more storage devices, the stored program instructions causing a processor to configure operations comprising:
   constructing a first cell in a wet-cell battery, the first cell comprising a set of anode electrodes and a set of cathode electrodes;
   identifying a surface inside the first cell, wherein electrically conductive debris accumulates on the surface to a height;
   configuring, by causing a processor and a memory to manipulate a fabrication machine, an anode electrode in the set of anode electrodes and a cathode electrode in the set of cathode electrodes, wherein the anode electrode has an anode end closest to the surface, wherein the cathode electrode has a cathode end closest to the surface, and wherein the configuring causes a first gap distance between the anode end and the surface to be different from a second gap distance between the cathode end and the surface; and
   preventing a short-circuit from the electrically conductive debris when the debris accumulates up to the height, by causing the debris to fail to make simultaneous electrical contact with the anode electrode and the cathode electrode due to the first gap distance being different from the second gap distance.

16. The computer usable program product of claim 15, wherein the debris reaches the height over a useful life of the wet-cell battery.

17. The computer usable program product of claim 15, wherein the debris comprises conductive material separating from at least one of the set of anode electrodes and the set of cathode electrodes.

18. The computer usable program product of claim 15, wherein the anode electrode comprises a plate having a flat shape and an edge, the edge forming the anode end.

19. The computer usable program product of claim 15, wherein the stored program instructions are stored in a computer readable storage device in a data processing system, and wherein the stored program instructions are transferred over a network from a remote data processing system.

20. The computer usable program product of claim 15, wherein the stored program instructions are stored in a computer readable storage device in a server data processing system, and wherein the stored program instructions are downloaded over a network to a remote data processing system for use in a computer readable storage device associated with the remote data processing system.

* * * * *